United States Patent
Matsui et al.

(10) Patent No.: US 8,083,193 B2
(45) Date of Patent: Dec. 27, 2011

(54) STRUCTURE FOR CONNECTING DISPLAY AND SUPPORTER, DISPLAY, STAND, AND ATTACHMENT

(75) Inventors: Seiji Matsui, Sagamihara (JP); Yoichiro Okoshi, Kamakura (JP); Yasuki Sato, Ashigarakami-gun (JP); Tadayuki Ito, Ashigarakami-gun (JP)

(73) Assignee: NEC Display Solutions, Ltd., Tokyo (JP)

( * ) Notice: Subject to any disclaimer, the term of this patent is extended or adjusted under 35 U.S.C. 154(b) by 714 days.

(21) Appl. No.: 12/159,149

(22) PCT Filed: Dec. 22, 2006

(86) PCT No.: PCT/JP2006/325662
§ 371 (c)(1),
(2), (4) Date: Jun. 25, 2008

(87) PCT Pub. No.: WO2007/074742
PCT Pub. Date: Jul. 5, 2007

(65) Prior Publication Data
US 2010/0219303 A1    Sep. 2, 2010

(30) Foreign Application Priority Data
Dec. 27, 2005   (JP) ................. 2005-374064

(51) Int. Cl.
*A47B 96/00* (2006.01)
*A47K 1/00* (2006.01)
*A47K 5/00* (2006.01)
*E04G 5/06* (2006.01)
*F16L 3/08* (2006.01)
*F21V 21/00* (2006.01)
*F21V 35/00* (2006.01)

(52) U.S. Cl. ......... 248/221.11; 248/222.51; 248/225.21; 248/917; 361/679.02; 361/679.05

(58) Field of Classification Search ............. 248/221.11, 248/222.13, 222.51, 225.21, 917, 127, 157; 403/321, 322.4, 353; 439/57; 292/95, 109, 292/113, 100, 106, 108, 137, 176, 194, 195, 292/198, 200, 202; 361/679.02, 679.06, 361/679.04, 679.05; 70/62, 63; 211/4–9
See application file for complete search history.

(56) References Cited

U.S. PATENT DOCUMENTS 4,632,594 A * 12/1986 Del Tufo et al. ........... 403/322.4
5,175,671 A * 12/1992 Sasaki ...................... 361/679.43
5,232,303 A *  8/1993 Rubner ........................ 403/330

(Continued)

FOREIGN PATENT DOCUMENTS

CN          2443462 Y     8/2001

(Continued)

*Primary Examiner* — Terrell McKinnon
*Assistant Examiner* — Michael McDuffie
(74) *Attorney, Agent, or Firm* — Sughrue Mion, PLLC (57) ABSTRACT

A structure for connecting a display and a supporter, capable of supporting the display even if it is medium-sized or relatively large-sized, and being easily attached and detached. The structure has a structure for connecting the display and a supporter that is connected to the backside of the display and supports the display. The supporter has an upwardly fixed claw, a movable claw, and an operation unit for moving the movable claw. On the backside of the display are arranged an engagement hole with which the fixed claw engages and an engagement groove with which the movable claw engages.

15 Claims, 6 Drawing Sheets

U.S. PATENT DOCUMENTS

| | | | |
|---|---|---|---|
| 6,042,068 A * | 3/2000 | Tcherny | 248/221.11 |
| 6,237,886 B1 * | 5/2001 | Katsumata et al. | 248/225.21 |
| 6,446,913 B1 * | 9/2002 | Schroeder | 248/27.1 |
| 6,554,238 B1 * | 4/2003 | Hibberd | 248/278.1 |
| 6,758,454 B2 * | 7/2004 | Smed | 248/314 |
| 6,813,147 B2 * | 11/2004 | Jeong | 361/679.06 |
| 6,863,252 B2 | 3/2005 | Bosson | |
| 7,175,152 B2 * | 2/2007 | Dittmer | 248/221.11 |
| 7,317,613 B2 * | 1/2008 | Quijano et al. | 361/679.41 |
| 7,334,762 B2 * | 2/2008 | Dittmer | 248/221.11 |
| 7,506,850 B2 * | 3/2009 | Chang | 248/221.11 |
| 7,543,787 B2 * | 6/2009 | Chen | 248/225.21 |
| 7,673,838 B2 * | 3/2010 | Oddsen et al. | 248/278.1 |
| 7,712,711 B2 * | 5/2010 | Jang | 248/125.8 |
| 7,766,296 B2 * | 8/2010 | Choi et al. | 248/346.01 |
| 2004/0012917 A1 * | 1/2004 | Jung et al. | 361/681 |
| 2005/0127260 A1 * | 6/2005 | Dittmer | 248/221.11 |
| 2007/0262210 A1 * | 11/2007 | Oh et al. | 248/125.1 |

FOREIGN PATENT DOCUMENTS

| | | |
|---|---|---|
| JP | 1-273086 | 10/1989 |
| JP | 08-295185 | 11/1996 |
| JP | 08-312885 | 11/1996 |
| JP | 11-201386 A | 7/1999 |
| JP | 11-352898 | 12/1999 |
| JP | 2001311498 A | 11/2001 |
| JP | 2002202742 A | 7/2002 |
| JP | 2003-15541 A | 1/2003 |
| WO | 2007-074742 | 7/2007 |

* cited by examiner

FIG. 7

STRUCTURE FOR CONNECTING DISPLAY AND SUPPORTER, DISPLAY, STAND, AND ATTACHMENT

TECHNICAL FIELD

The present invention relates to a structure for connecting a display and a supporter, a display, a stand, and an attachment.

Priority is claimed on Japanese Patent Application No. 2005-374064, filed Dec. 27, 2005, the content of which is incorporated herein by reference.

BACKGROUND ART

In general, a display to be used as a display device for a personal computer, etc. is supported by a stand fixed on the backside thereof in use. With respect to a fixation for the display and the stand above, there is the FPMPMI (Flat Panel Monitor Physical Mounting Interface), standardized by VESA (Video Electronics Standard Association). According to the VESA standard, four positions corresponding to 75 mm×75 mm or 100 mm×100 mm pitch are attached according to a display size.

As a matter of course, the display is not easily detached from the stand in the above structure. However, for example, when a relatively large number of displays are arranged in use, a user sometimes rearranges, depending on availability of the displays in use, the displays to improve the usability. In such a case, the rearrangement will be easier if the display is easily detached from the stand.

A technique in which an on-board, small-sized display is detachable from a stand has been proposed in Patent Documents 1 and 2.

Patent Document 1: Japanese Unexamined Patent Application, First Publication, No. H08-312885
Patent Document 2: Japanese Unexamined Patent Application, First Publication, No. H08-295185

DISCLOSURE OF THE INVENTION

Problems to be Solved by the Invention

However, although both Patent Documents 1 and 2 above disclose a technique for attachment of an on-board, small-sized display, if the technique is applied to a medium-sized or a relatively large-sized display for a personal computer, a problem arises in that the weight of the display cannot be supported.

Therefore, it is an object of the present invention to propose a structure for connecting a display and a supporter, a display, a stand, and an attachment that can support even a medium-sized or a relatively large-sized display.

Means for Solving the Problems

To achieve the above object, a structure for connecting a display and a supporter according to the present invention includes: an upwardly fixed claw, a movable claw, and an operation unit that moves the movable claw which are provided on the supporter; and an engagement hole that is formed on a backside of the display, and engages with the fixed claw; and an engagement groove that is formed on the backside, and engages with the movable claw.

In the structure for connecting the display and the supporter according to the present invention, it is preferable to provide a guide pin on the supporter, and a guide hole into which the guide pin fits on the backside of the display.

In the structure for connecting the display and the supporter according to the present invention, it is preferable to provide a flat side with which the supporter is to be in contact on the backside of the display, and the engagement hole and the engagement groove on the flat side.

In the structure for connecting the display and the supporter according to the present invention, the supporter may be a stand.

In the structure for connecting the display and the supporter according to the present invention, the supporter may be an attachment attachable to a VESA-standard-compliant support member.

Additionally, a display according to the present invention is a display supported by a supporter including an upwardly fixed claw, a movable claw, and an operation unit that moves the movable claw, and includes an engagement hole that is provided on a backside of the display, and engages with the fixed claw; and an engagement groove that is provided on the backside, and engages with the movable claw.

In the display according to the present invention, it is preferable to provide, on the backside, a guide hole into which a guide pin of the supporter fits.

In the display according to the present invention, it is preferable to provide, on the backside, a fixing portion fixable to a VESA-standard-compliant support member.

In the display according to the present invention, it is preferable to provide a flat side that is to be in contact with the supporter on the backside, and the engagement hole and the engagement groove on the flat side.

Furthermore, a stand according to the present invention is connectable to a backside of a display including an engagement hole and an engagement groove on the backside, and includes an upwardly fixed claw that fits the engagement hole; a movable claw that fits the engagement groove; and an operation unit that moves the movable claw.

It is preferable that the stand according to the present invention include a guide pin that fits into a guide hole provided on the backside of the display.

Moreover, an attachment according to the present invention is an attachment connectable to a backside of a display including an engagement hole and an engagement groove on the backside, and includes: an upwardly fixed claw that fits into the engagement hole; a movable claw that fits into the engagement groove; an operation unit that moves the movable claw; and a fixing portion that is fixable to a VESA-standard-compliant support member.

It is preferable that the attachment according to the present invention includes a guide pin that fits into a guide hole provided on the backside of the display.

Effects of the Invention

According to the present invention, the supporter can be connected to the backside of the display by the upwardly fixed claw of the supporter being engaged with the engagement hole provided on the backside of the display, and the movable claw of the supporter being engaged with the engagement groove provided on the backside of the display. By the operation unit being operated to move the movable claw, the supporter can be detached from the display with a one-touch operation. As explained above, since the weight of the display can be supported by the upwardly fixed claw of the supporter, even a medium-sized or the relatively large-sized display can be supported with a simple structure. Furthermore, since the engagement hole and the engagement groove may be pro-

DESCRIPTION OF NUMERALS 10 display
19 flat side (backside)
23 stand (supporter)
26, 27 engagement hole
32, 33 engagement groove
34, 35 guide hole
37 attachment insertion hole (fixing portion)
38 attachment hole (fixing portion)
51 fixed claw
58 movable claw
65 lock release lever (operation unit)
69 guide pin
72 support member
77 attachment (supporter)

BEST MODE FOR CARRYING OUT THE INVENTION

With reference to the attached drawings, an embodiment of the present invention is explained below.

Figure 1:
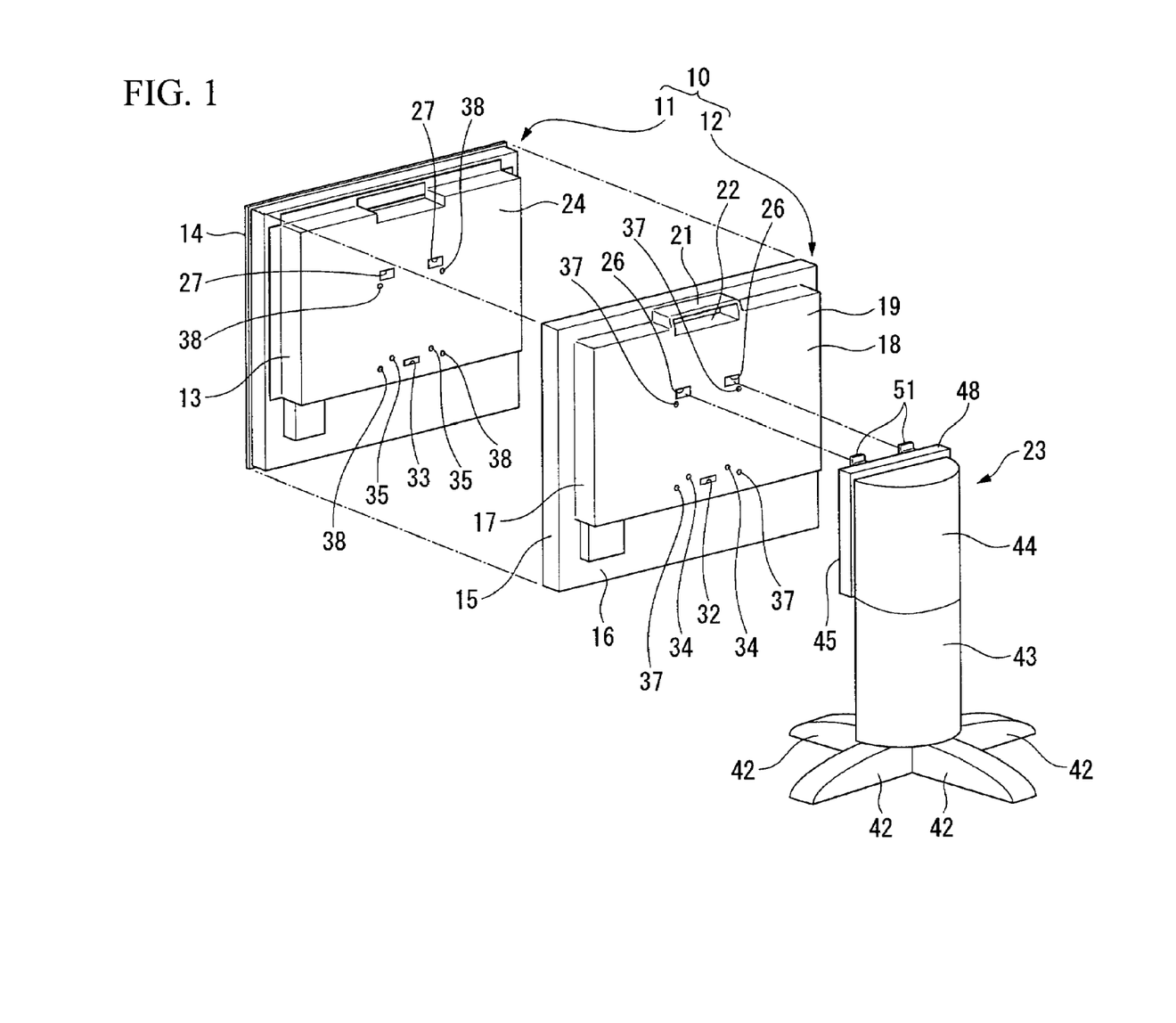
FIG. 1 is an exploded perspective view showing a display and a stand according to an embodiment of the present invention.

A display 10 shown in FIG. 1 is structured such that a backside of a main display 11 is covered by a case 12 that is a synthetic-resin integrated molding. The main display 11 includes a non-depicted liquid crystal display and various components that are mounted on a metal internal chassis 13, and a resin front cover 14 surrounding the liquid crystal display.

The case 12 includes an outer frame 15 that is landscape-oriented and in a substantially rectangular frame shape, an intermediate backboard 16, an intermediate frame 17, and a backboard 18. The intermediate backboard 16 extends inward from the entire circumference of a rim of the outer frame 15. The intermediate frame 17 protrudes in a substantially rectangular shape on the opposite side of the outer frame 15 from an internal rim of the intermediate backboard 16. The backboard 18 is formed to cover the inside of the entire circumference of the rim of the intermediate frame 17 on the opposite side of the intermediate backboard 16, and is positioned at the end of the case 12. The backside of the backboard 18 is a flat side 19 without a protuberance. At the upper portion of the intermediate frame 17 and the backboard 18, a handle 21 is provided above a finger insertion space 22 to be held when the display 10 is carried.

Figure 2:
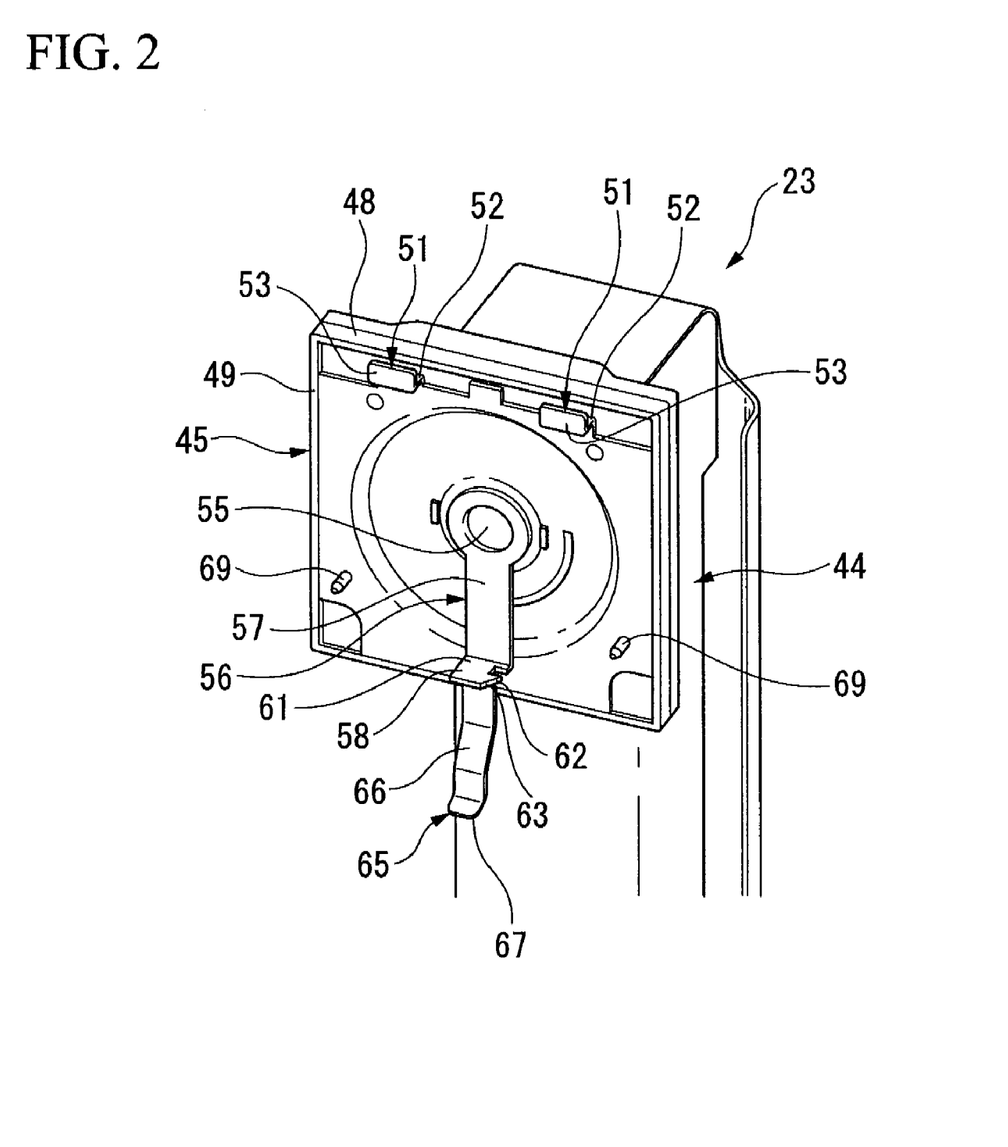
FIG. 2 is a perspective view of a main part showing the stand according to the embodiment of the present invention.

The case 12 is attached to the display body 11 so as to cover the backside of the display body 11, thereby forming the display 10. A backboard 24 at the end of the internal chassis 13 of the main display 11 contacts with and fits into the backboard 18 of the case 12. A stand (supporter) 23 shown in FIG. 2 is detachably attached on the flat side 19 of the backboard 18 of the display 10.

Figure 3:
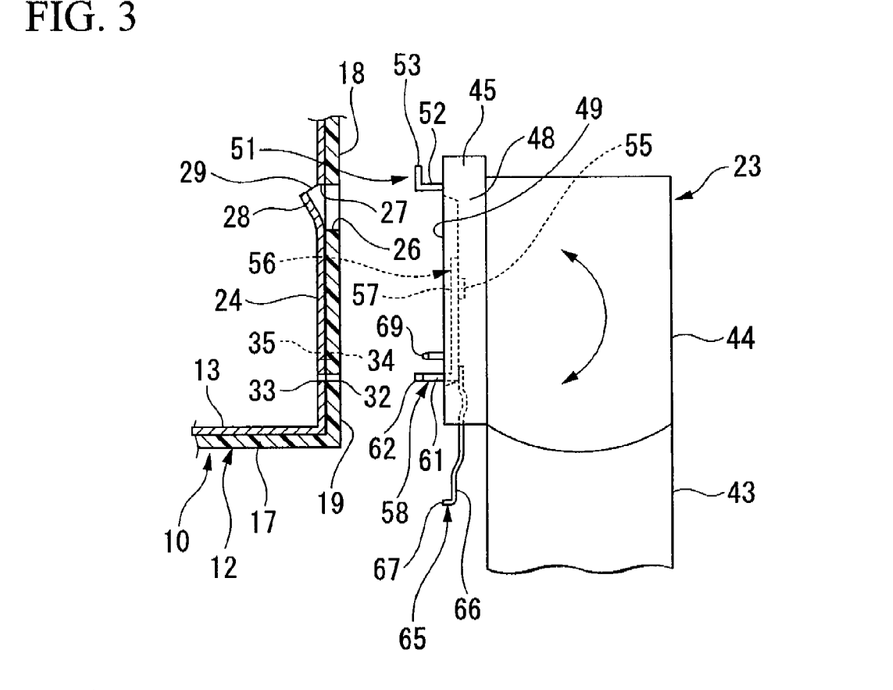
FIG. 3 is a sectional side view showing the display and the stand before an attachment according to the embodiment of the present invention.
Figure 4:
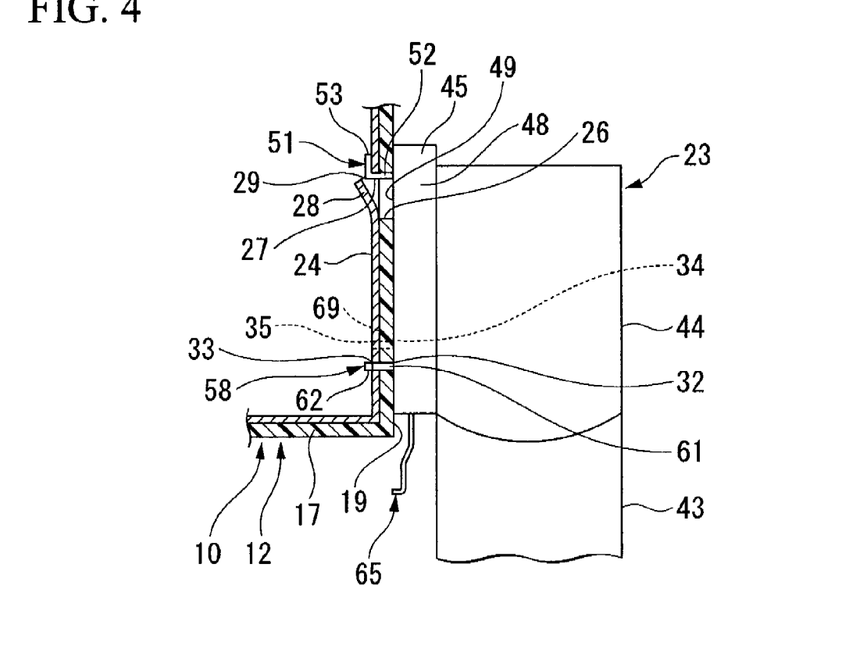
FIG. 4 is a sectional side view showing the display and the stand after an attachment according to the embodiment of the present invention.

A pair of engagement holes 26 that are in a square shape viewed from the back is formed at symmetric positions with respect to the center in the horizontal direction on the backboard 18 of the case 12 including the smooth flat side 19. A pair of engagement holes 27, the positions and size of which correspond to those of the engagement holes 26, and which are in a square shape viewed from the back, is also formed on the backboard 24 of the internal chassis 13. As shown in FIGS. 3 and 4, the engagement hole 26 on the backboard 18 of the case 12 penetrates in the thickness direction. On the other hand, the engagement hole 27 on the backboard 24 of the internal chassis 13 is formed by cutting the upper edge of the engagement hole 27 without cutting the side and the bottom edges thereof, and pressing the inside thereof by a press. As a result, on the backside of the engagement hole 27, a curved portion 28 is formed that is inclined such that the protrusion degree from the backboard 24 is greater at the upper portion, and both side portions in the horizontal direction merge onto the backboard 24. As a result, the engagement hole 27 has an opening 29 that opens upwardly from the backside 24 on the back.

As shown in FIG. 1, on the backboard 18 of the case 12, in the center of the horizontal direction below the engagement hole 26, an engagement groove 32 that is landscape-oriented viewed from the back is formed penetrating in the thickness direction. Similarly, on the backboard 24 of the internal chassis 13, an engagement groove 33, the position and size of which correspond to those of the engagement groove 32, and which is landscape-oriented viewed from the back, is formed penetrating in the thickness direction.

On the backboard 18 of the case 12, at symmetric positions with respect to the center in the horizontal direction slightly above the engagement groove 32, a pair of guide holes 34 in a circular-hole shape is formed penetrating in the thickness direction. Similarly, on the backboard 24 of the internal chassis 13, a pair of guide holes 35, the positions and size of which correspond to those of the guide holes 34, is formed penetrating in the thickness direction.

On the backboard 18 of the case 12, attachment insertion holes (fixing portions) 37 are formed penetrating in the thickness direction at positions that do not interfere with a pair of the engagement holes 26, the engagement groove 32, and a pair of the guide holes 34, which are positions regulated by the VESA standard according to the size of the display 10 (for example, four positions corresponding to 75 mm×75 mm pitch). Similarly, on the backboard 24 of the internal chassis 13, attachment holes (fixing portions) 38 are formed at the positions of which correspond to those of the attachment insertion holes 37.

Thus, the engagement holes 26 and 27, the engagement grooves 32 and 33, guide holes 34 and 35, the attachment insertion holes 37 and the attachment holes 38 that are VESA-standard-compliant are provided on the display 10.

The display 10 that is structured such that the case 12 is attached on the main display 11 to cover the backside thereof as explained above is supported by, for example, an exclusively independent stand 23 shown in FIG. 1, which is connected to the flat side 19.

The stand 23 is for detachably supporting the display 10, and includes plural legs 42 that are provided radially, a columnar support 43 extending upwardly from the center of the legs 42, and a head 44 that is rotatably supported in the horizontal direction at the upper portion of the columnar support 43. A support mechanism 45 that supports the display 10 is provided at one side of the head 44.

The support mechanism 45 is made of metal, and includes a substantially quadrangular base 48 as shown in FIGS. 2 to 4. The base 48 includes a contact side 49 in a frame shape, of which the entire circumference is positioned anterior to the inside thereof and contacts with the display 10. At the upper portion of the base 48 is provided a pair of fixed claws 51 protruding more forward than the contact side 49 from symmetric positions with respect to the horizontal direction. Each of the fixed claws 51 arranged in the horizontal direction includes a forward protruding plate 52 protruding forward and perpendicular to the contact side 49, and an upwardly protruding plate 53 protruding upwardly from the front edge of the forward protruding plate 52 along the contact side 49. In other words, the edges of the fixed claws 51 extend upwardly.

Figure 5:
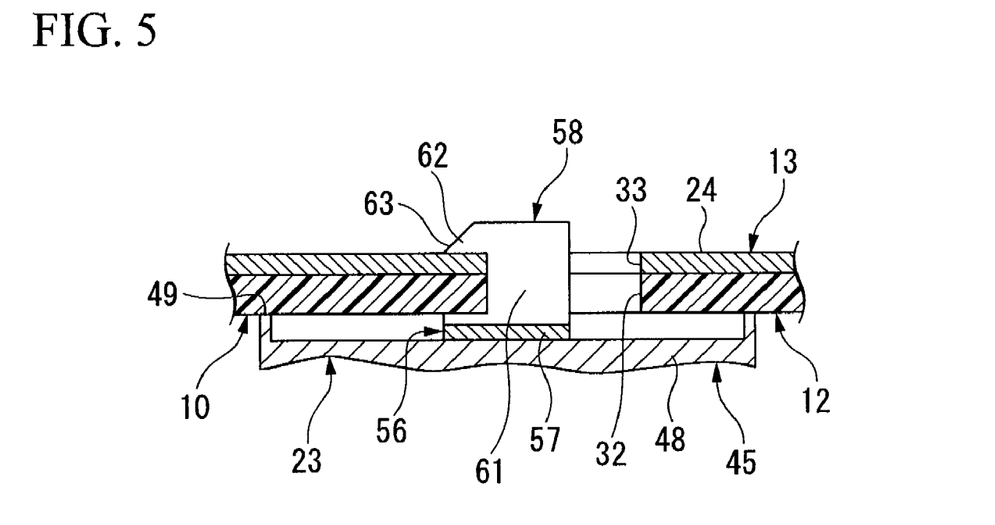
FIG. 5 is a horizontal sectional view showing an engagement groove of the display and a movable craw of the stand according to the embodiment of the present invention.

In the substantial center of the base 48 is provided a support axis 55 perpendicular to the contact side 49. At the support axis 55 is supported a plate-like lock member 56 that is rotatable about the support axis 55 as a pivot. The lock member 56 includes a downwardly extending plate 57 extending downwardly and in parallel with the contact side 49 from the support axis 55, and a movable claw 58 extending forward and perpendicular to the contact side 49 from the bottom portion of the downwardly extending plate 57. The lock member 56 extends downwardly and contacts with a non-depicted stopper due to a force applied by a non-depicted spring. The lock member 56 is rotatable against the force applied by the spring in the direction away from the stopper, and the movable claw 58 can be moved by the lock member 56 rotating in this direction. The movable claw 58 includes an extending plate 61, and a claw 62 protruding laterally from one side of the edge of the extending plate 61 in the horizontal direction. With the lock member 56 being in contact with the stopper, the extending plate 61 extends in parallel with the forward protruding plate 52 of the fixed claw 51. The extending plate 61 is also shown in FIG. 5. The claw 62 protrudes from the extending plate 61 in the direction of the force applied by the spring. A chamfer 63 is formed at the corner of the claw 62.

As shown in FIG. 2, a lock release lever (operation unit) 65 that moves the movable claw 58 by rotating the lock member 56 is fixed to the lock member 56. The lock release lever 65 extends downwardly from the base 48. The lock release lever 65 includes a downwardly extending plate 66 extending downwardly from the lock member 56, and a forward extending plate 67 extending forward in parallel with the movable claw 58 from the bottom portion of the downwardly extending plate 66.

On the base 48 is provided a pair of guide pins 69 that project more forward than the contact side 49 from the positions that are at slightly upper portions of the movable claw 58 and symmetric with respect to the center in the horizontal direction. The guide pins 69 are in a cylindrical shape, and only the edges thereof are in a tapered shape.

When the stand 23 is attached to the display 10, the stand 23 is inclined in an anterosuperior direction with respect to the display 10 from the state shown in FIG. 3, and the fixed claws 51 are inserted from the back into the engagement holes 26 and 27. In other words, the upper protruding plates 53 of the fixed claws 51 pass through the engagement holes 26 and 27 to be inserted from the bottom into the openings 29 of the engagement holes 27. As a result, the forward protruding plates 52 of the fixed claws 51 contact with the upper edges of the engagement holes 26 and 27, and a display 10 is supported by a pair of the fixed claws 51. In other words, the fixed claws 51 are engaged with the engagement holes 26 and 27.

When the lower portion of the stand 23 becomes closer to the display 10 in the above state, the movable claw 58 is inserted into the engagement grooves 32 and 33, and the chamfer 63 is pressed toward the sides of the engagement grooves 32 and 33. As a result, the lock member 56 rotates against the force applied by the non-depicted spring, and the claw 62 of the movable claw 58 passes over the engagement grooves 32 and 33 and returns due to the force applied by the spring. The claw 62 is thus fixed at the backside of the backside board 24 of the internal chassis 13 as shown in FIGS. 4 and 5. In other words, the movable claw 58 is engaged with the engagement grooves 32 and 33. At the same time, the guide pins 69 fit into the guide holes 34 and 35. In this state, the base 48 is entirely in contact with the flat plate 19 of the display 10 at the contact side 49. As a result, a forward-and-backward movement is restricted by the fixed claws 51 and the movable claw 58, an upward-and-downward movement is restricted by the guide pins 69 and the movable claw 58, and a lateral movement is restricted by the guide pins 69, thereby making the stand 23 fixed on the display 10. Furthermore, in this state, the weight of the display 10 is supported by the fixed claws 51 and the guide pins 69. Moreover, in this state, the lock release lever 65 protrudes downwardly from the flat side 19 of the display 10.

On the other hand, when the stand 23 is detached from the display 10, the lock release lever 65 oscillates against the force applied by the non-depicted spring, and the claw 62 of the movable claw 58 shifts to the position of the engagement grooves 32 and 33. In this state, the lower portion of the stand 23 is distanced from the display 10, and the movable claw 58 and the guide pins 69 are pulled out from the engagement grooves 32 and 33, and the guide holes 34 and 35, respectively. Then, the fixed claws 51 are pulled out from the engagement holes 26 and 27. As a result, the stand 23 is detached from the display 10. In other words, the stand 23 can be detached from the display 10 with a one-touch operation using the lock release lever 65.

Figure 6:
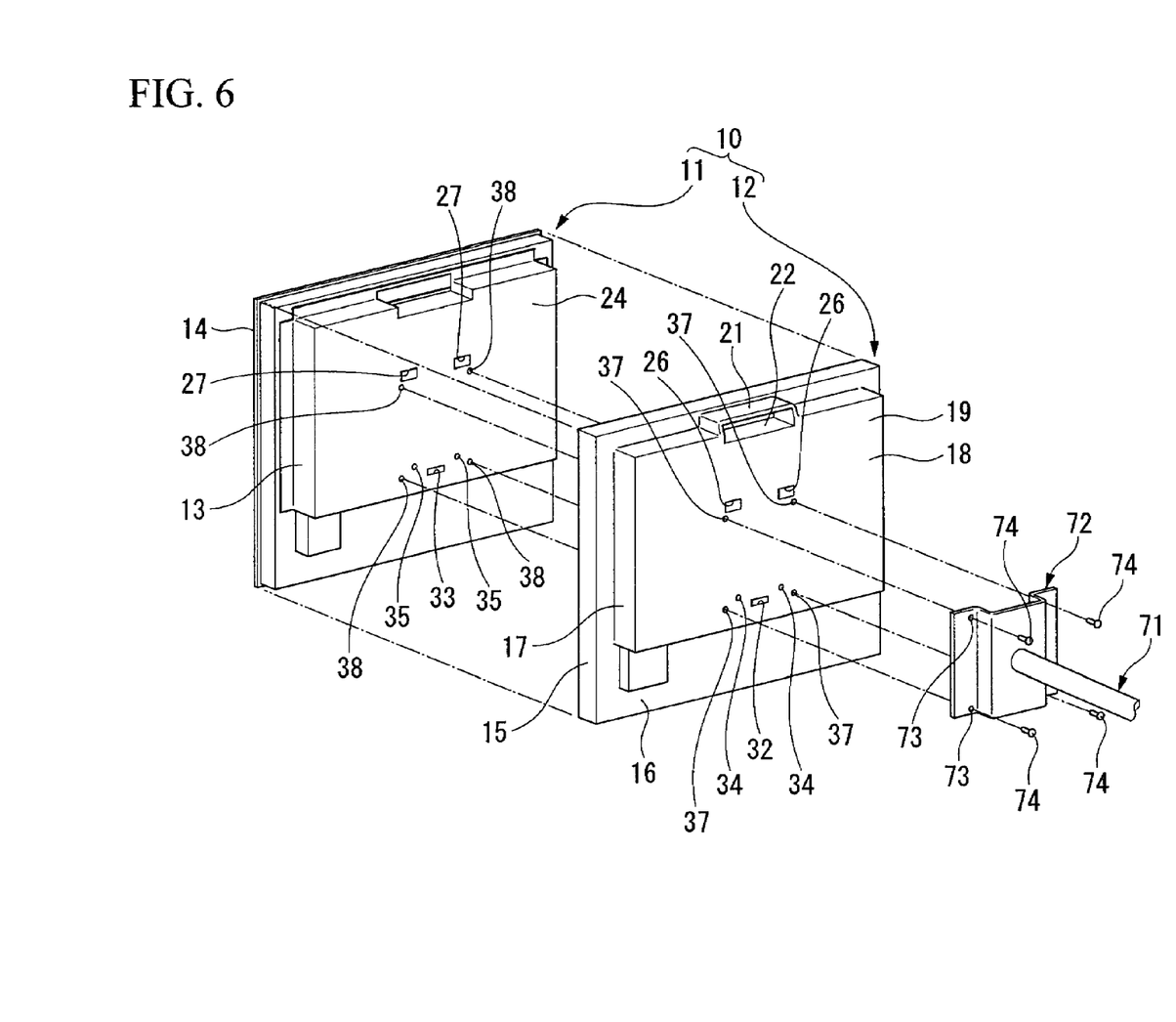
FIG. 6 is an exploded perspective view showing a case in which a general-purpose stand is attached to the display according to the embodiment of the present invention.

The stand 10 can be supported by, for example, a general-purpose stand 71 shown in FIG. 6, which is connected to the flat side 19. The stand 71 includes, on the edge thereof, a metal support member 72 that is VESA-standard-compliant. On the support member 72, attachment insertion holes 73 are formed penetrating in the thickness direction at the positions regulated by the VESA standard according to the size of the display 10 (for example, four positions corresponding to 75 mm×75 mm pitch).

When the stand 71 above is fixed on the display 10, screws 74 are inserted into the attachment insertion holes 73 with the support member 72 being in contact with the flat side 19 of the display 10. The screws 74 are inserted into the attachment insertion holes 37 of the case 12 to be threadably mounted on the attachment holes 38 of the internal chassis 13. Thus, the support member 72 is attached and fixed to the display 10 at the position of each attachment insertion hole 73. In this case, the display 10 is not detachable from the stand 71 with a one-touch operation.

Figure 7:
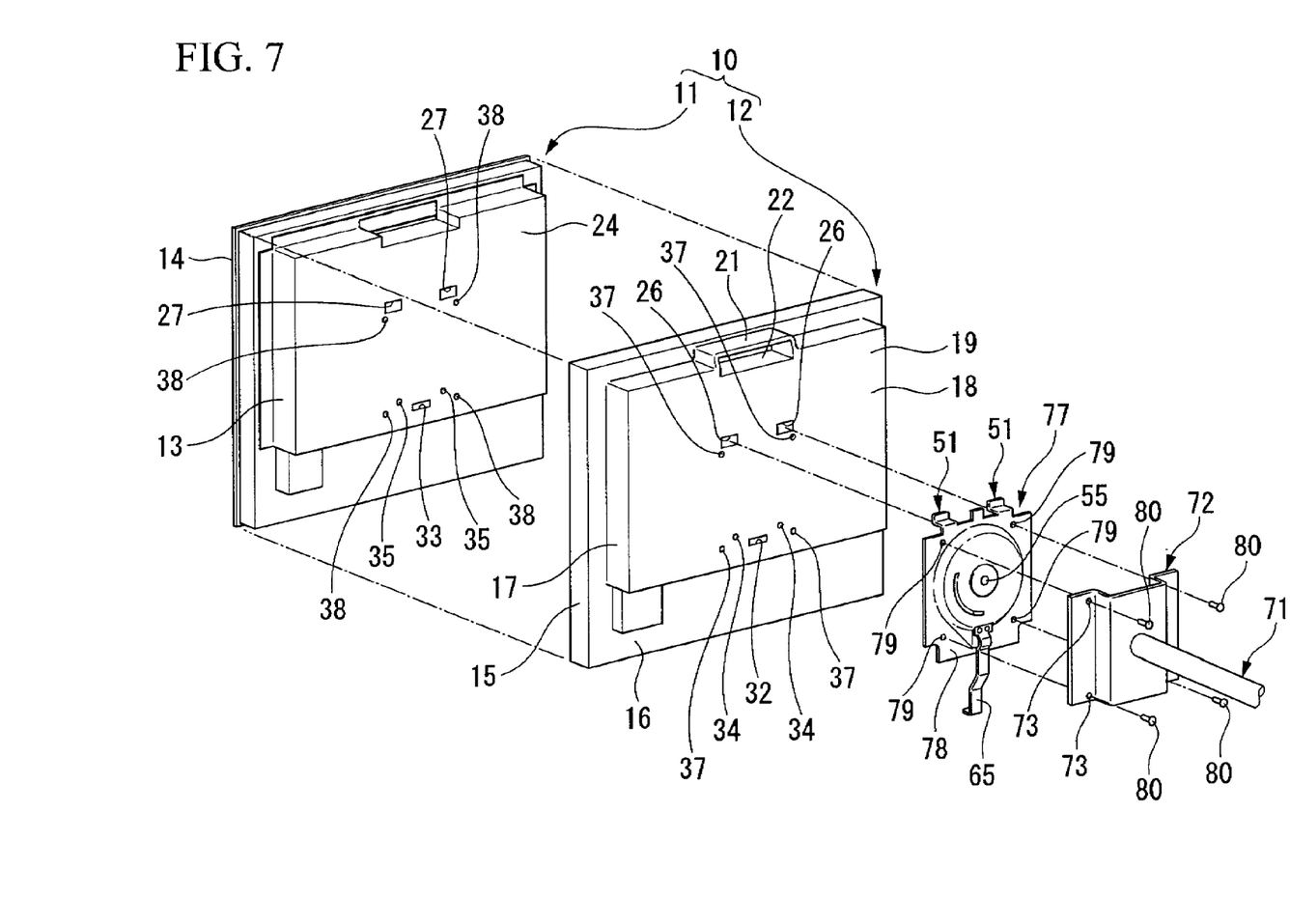
FIG. 7 is an exploded perspective view showing a case in which the general-purpose stand is attached to the display and an attachment according to the embodiment of the present invention.

Meanwhile, with the use of an attachment (supporter) 77 shown in FIG. 7, the display 10 is detachable from the general-purpose stand 71 with a one-touch operation.

The attachment 77 is made of metal, and has a similar structure to the metal support mechanism 45 of the stand 23 explained above. In other words, the attachment 77 includes, on a plate-like base 78, a pair of the upwardly fixed claws 51 that engage with the engagement holes 26 and 27 of the display 10, the support axis 55, the lock member 56 (not shown in FIG. 7) including the movable claw 58 that engages with the engagement grooves 32 and 33 of the display 10. Additionally, the attachment 77 includes the lock release lever 65 for moving the movable claw 58, the non-depicted spring, a pair of the guide pins 69 (not shown in FIG. 7) that fit into the guide holes 34 and 35, etc.

The attachment 77 is fixable to the VESA-standard-compliant support member 72 of the general-purpose stand 71. In other words, on the base 78 thereof, attachment holes 79 are formed at positions regulated by the VESA standard according to the size of the display 10 (for example, four positions corresponding to 75 mm×75 mm pitch).

The attachment 77 is fixed to the support member 72 of the stand 71. In other words, the base 78 is assembled by the support member 72, the screws 80 are inserted from the back into the attachment insertion holes 73, and the screws 80 are threadably mounted on the attachment holes 79 of the attachment 77. In this manner, the attachment 77 is attached and fixed onto the support member 72 of the stand 71 at the position of each attachment hole 79. Similar to the exclusive stand 23 above, the attachment 77 fixed onto the general-purpose stand 71 in this manner is detachable from the display 10.

According to the embodiment explained above, the upwardly fixed claws 51 of the stand 23 or the attachment 77 engage with the engagement holes 26 and 27 provided on the flat side 19 of the backside of the display 10, the case 12, and the internal chassis 13. The movable claw 58 of the stand 23 or the attachment 77 engages with the engagement grooves 32 and 33 provided on the flat side 19 of the backside of the display 10, the case 12, and the internal chassis 13. As a result, the stand 23 or the attachment 77 can be connected to the flat side 19 of the backside of the display 10. Furthermore, the stand 23 or the attachment 77 can be detached from the display 10 with a one-touch operation by using the lock release lever 65 to move the movable claw 58. As explained above, the upwardly fixed claws 51 on the stand 23 or the attachment 77 support the weight of the display 10. Therefore, even a medium-sized or a relatively large-sized display 10 can be supported with a simple structure. Additionally, the engagement holes 26 and 27, and the engagement grooves 32 and 33 may be provided on the backside of the display 10. Therefore, the backside of the display 10 can be the flat side 19 without a protuberance, and another general-purpose stand 71, etc., can be easily attached thereto.

When the display 10 is connected to the stand 23 or the attachment 77, the guide pins 69 provided on the stand 23 or the attachment 77 fit into the guide holes 34 and 35 provided on the flat side 19 of the backside of the display 10, the case 12, and the internal chassis 13. As a result, unsteadiness of the display 10 with respect to the stand 23 or the attachment 77 can be prevented.

The flat side 19 with which the stand 23 or the attachment 77 is to be in contact is provided on the backside of the display 10, and on the flat side 19 is provided the engagement holes 26 and 27, and the engagement grooves 32 and 33. As a result, another general-purpose stand 71 can be attached easily. In other words, the stand 71 including the VESA-standard-compliant support member 72 can be attached to the VESA-standard-compliant attachment insertion holes 37 provided on the flat side 19 of the backside of the display 10, and attachment holes 38.

The display 10 can be disposed on a desk, etc., by providing the above structure to the stand 23. Furthermore, by providing the above structure to the attachment 77 attachable to the VESA-standard-compliant support member 72 of the stand 71, the attachment 77 can be fixed to the general-purpose stand 71 including the VESA-standard-compliant support member 72. As a result, the general-purpose stand 71 can be detachably connected to the display 10 with a one-touch operation.

INDUSTRIAL APPLICABILITY

The present invention can be used for a structure for connecting a display and a supporter that can support even a medium-sized or relatively large-sized display, and make attachment and detachment of the display easy.

The invention claimed is:

1. A stand for supporting a flat screen display comprising: a supporter having a first surface, the supporter comprising: a fixed claw having first and second portions, the first portion extending from the first surface, and the second portion extending vertically from the first portion; and a movable claw comprising third and fourth portions, the third portion extending in parallel with the first surface, the third portion having a first end portion and a second end portion, the first end portion being rotatably connected to the first surface, and the fourth portion extending vertically from the second end portion; and a display having a rear surface to which the supporter is attachable, the display comprising: a first hole in the rear surface, the second portion being insertable through the first hole; and a second hole in the rear surface, the second hole being separated from the first hole, and the fourth portion being engageable with the second hole.

2. The structure according to claim 1, wherein the supporter further comprises:
   a guide pin on the first surface of the supporter, and the display further comprises:
   a guide hole in the rear surface of the display, the guide pin being attachable to the guide hole.

3. The structure according to claim 1, wherein the supporter further comprises:
   an operation lever for detaching the fourth portion from the second hole, the operation lever being fixed to the movable claw.

4. The structure according to claim 1, wherein the supporter is a stand.

5. The structure according to claim 1, wherein the supporter is attachable to a VESA-standard-compliant support member.

6. A flat screen display stand having a rear surface attachable to a supporter, the supporter comprising: a fixed claw having first and second portions, the first portion extending from a first surface of the supporter, and the second portion extending vertically from the first portion; and a movable claw comprising third and fourth portions, the third portion extending in parallel with the first surface, the third portion having a first end portion and a second end portion, the first end portion being rotatably connected to the first surface, and the fourth portion extending vertically from the second end portion, and the display comprising: a first hole in the rear surface, the second portion being insertable through the first hole; and a second hole in the rear surface, the second hole being separated from the first hole, and the fourth portion being engageable with the second hole.

7. The display according to claim 6, further comprising:
a guide hole in the rear surface of the display, a guide pin on the first surface of the supporter being attachable to the guide hole.

8. The display according to claim 6, further comprising:
a fixing portion on the rear surface of the display, the fixing portion being fixable to a VESA-standard-compliant support member.

9. The display according to claim 6, wherein the rear surface of the display has a flat portion having the first and second holes, the flat portion being in contact with the first surface of the supporter when the display is attached to the supporter.

10. A stand attachable to a rear surface of a flat screen display, the rear surface of the display having a first hole and a second hole separated from the first hole, the stand comprising: a fixed claw having first and second portions, the first portion extending vertically from a first surface of the stand, the second portion extending vertically from the first portion, and the second portion being insertable through the first hole; and a movable claw comprising third and fourth portions, the third portion extending in parallel with the first surface, the third portion having a first end portion and a second end portion, the first end portion being rotatably connected to the first surface, the fourth portion extending vertically from the second end portion, and the fourth portion being engageable with the second hole.

11. The stand according to claim 10, further comprising:
a guide pin on the first surface of the stand, the guide pin being attachable to a guide hole in the rear surface of the display.

12. The stand according to claim 10, further comprising:
an operation lever for detaching the fourth portion from the second hole, the operation lever being fixed to the movable claw.

13. An attachment attachable to a rear surface of a flat screen display, the rear surface of the display having a first hole and a second hole separated from the first hole, the attachment comprising: a fixed claw having first and second portions, the first portion extending vertically from a first surface of the attachment, the second portion extending vertically from the first portion, and the second portion being insertable through the first hole; and a movable claw comprising third and fourth portions, the third portion extending in parallel with the first surface, the third portion having a first end portion and a second end portion, the first end portion being rotatably connected to the first surface, the fourth portion extending vertically from the second end portion, and the fourth portion being engageable with the second hole; and a fixing portion that is attachable to a VESA-standard-compliant support member.

14. The attachment according to claim 13, further comprising:
a guide pin on the first surface of the attachment, the guide pin being attachable to a guide hole in the rear surface of the display.

15. The attachment according to claim 13, further comprising:
an operation lever for detaching the fourth portion from the second hole, the operation lever being fixed to the movable claw.

* * * * *